US008109265B1

(12) United States Patent
Kolb

(10) Patent No.: US 8,109,265 B1
(45) Date of Patent: Feb. 7, 2012

(54) SUCTION-RECIRCULATION DEVICE FOR STABILIZING PARTICLE FLOWS WITHIN A SOLAR POWERED SOLID PARTICLE RECEIVER

(75) Inventor: Gregory J. Kolb, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 482 days.

(21) Appl. No.: 12/368,327

(22) Filed: Feb. 10, 2009

(51) Int. Cl.
*F24J 2/00* (2006.01)

(52) U.S. Cl. ........................................ 126/684; 126/714

(58) Field of Classification Search .................. 126/684, 126/714; 60/641.8, 655
See application file for complete search history.

(56) References Cited

U.S. PATENT DOCUMENTS 4,055,948 A * 11/1977 Kraus et al. .................. 60/641.8
7,033,570 B2 * 4/2006 Weimer et al. ................ 423/650

OTHER PUBLICATIONS

Nathan, Siegel et al, “Design and On-Sun Testing of a Solid Particle Receiver Prototype”, Proceedings of ES2008, Energy Sustainability 2008, Aug. 10-14, 2008, Jacksonville, Florida USA.

Hruby, J. M., et al, An Experimental and Numerical Study of Flow and Convective Heat Transfer in a Freely Falling Curtain of Particles, Sandia Report, Printed Apr. 1986.

Hruby, J. M., “A Technical Feasibility Study of a Solid Particle Solar Central Receiver for high Temperature Applications”, Sandia Report, Printed Mar. 1986.

Kolb, Gregory J., et al, “Central-Station Solar Hydrogen Power Plant”, Journal of Solar energy Engineering, May 2007, vol. 129.

* cited by examiner

*Primary Examiner* — Alfred Basichas
(74) *Attorney, Agent, or Firm* — Olivia J. Tsai

(57) ABSTRACT

A suction-recirculation device for stabilizing the flow of a curtain of blackened heat absorption particles falling inside of a solar receiver with an open aperture. The curtain of particles absorbs the concentrated heat from a solar mirror array reflected up to the receiver on a solar power tower. External winds entering the receiver at an oblique angle can destabilize the particle curtain and eject particles. A fan and ductwork is located behind the back wall of the receiver and sucks air out through an array of small holes in the back wall. Any entrained particles are separated out by a conventional cyclone device. Then, the air is recirculated back to the top of the receiver by injecting the recycled air through an array of small holes in the receiver's ceiling and upper aperture front wall. Since internal air is recirculated, heat losses are minimized and high receiver efficiency is maintained. Suction-recirculation velocities in the range of 1-5 m/s are sufficient to stabilize the particle curtain against external wind speeds in excess of 10 m/s.

21 Claims, 16 Drawing Sheets

12
16
17
22
24
15
14
20
19
26
28
18

Sec B-B 50
38
16
22
40
42
12
32
24
36
34
44
14
23
20
30
37
26
18

Sec B-B

Sec B-B

Sec A-A

Sec A-A

Sec B-B

*(Holes not shown)*

(Holes not shown)

Section B-B 10 m/s wind from an oblique angle causes particles near back wall to be expelled from open aperture (no suction-recirculation activated)

(Holes not shown)

Section B-B

With suction-recirculation device activated and external wind, particles near back wall are not expelled from aperture

*(Holes not shown)*

Section B-B 5 m/s recirculation only (no external wind)

Sec B-B

Sec B-B

SUCTION-RECIRCULATION DEVICE FOR STABILIZING PARTICLE FLOWS WITHIN A SOLAR POWERED SOLID PARTICLE RECEIVER

FEDERALLY SPONSORED RESEARCH

The United States Government has rights in this invention pursuant to Department of Energy Contract No. DE-AC04-94AL85000 with Sandia Corporation.

CROSS-REFERENCE TO RELATED APPLICATIONS

None

BACKGROUND OF THE INVENTION

The present invention relates generally to a method and apparatus for collecting and transferring solar heat energy concentrated by an array of mirrors (heliostats).

Solar power tower systems use an array of several thousand heliostats to focus sunlight onto a central receiver mounted on top of a tower. When heat is collected at a temperature of >900° C. it can be used to power a thermo-chemical cycle that produces hydrogen at a much lower cost than conventional solar electrolysis. The leading candidate for the 900° C. solar receiver is known as the Solid Particle Receiver. In this receiver concept (illustrated in FIGS. 1-3) originally proposed by Sandia California in the mid-1980's, blackened alumina particles (the size of common beach sand) directly absorb the solar energy as they fall near the back wall within an open cavity (receiver).

A thermo-chemical (TC) process to produce hydrogen typically requires a heat input in excess of 900° C. This heat can be supplied by using either solar or nuclear energy. There has been significant work done to identify viable water splitting processes. Historically, processes receiving the most attention were those having a maximum temperature of around 900° C. that could be linked with a nuclear energy input. The Sulfur-Iodine and Hybrid Sulfur processes, developed by General Atomics and Westinghouse, respectively, are two examples. Processes requiring still higher temperatures are achievable only with a solar energy input. The Zinc-Oxide and Ferrite processes require heat input at a temperature of 2000° C. and 1600° C., respectively, and may be considered "solar-only".

Integrating a TC process with a solar energy input requires a suitable solar interface. The prevailing wisdom with regard to the design of TC hydrogen production facilities is that bigger is better due to the economies of scale and operational considerations. Because of this, TC processes suitable for a central receiver platform tend to have more favorable economics. In addition, a central receiver facility has the potential to offer thermal storage and "around-the-clock" operation. The principal challenges involved with the central receiver solar interface for TC processes are 1) identifying a suitable heat transfer and storage media and 2) designing a receiver that is efficient at the required temperatures. The solid particle receiver addresses both of these challenges. "Around-the-clock" plant operation can be achieved by integrating 13 hours of solid-particle thermal storage into the design of the solar plant. Since solid-particles have high heat capacity and are relatively inexpensive, it is cost-effective to include storage into the design.

The Solid Particle Receiver (SPR) was initially studied in the early 1980's in an effort to create a direct absorption central receiver capable of interfacing with high temperature (>900° C.) electric power and chemical-production cycles. In its simplest configuration the SPR consists of a curtain of particles that are dropped through a beam of concentrated solar energy, within a cavity, and heated. The particles are typically dark in color and made of a ceramic material, such as sintered bauxite. The heated particles can then be stored and run through a heat exchanger to provide thermal energy input to a process. The dimensions of the receiver are quite large. As shown in FIG. 3, for a 350 $MW_{th}$ commercial receiver concept, the opening of the rectangular aperture can be as large as 15 meter wide by 11 meters tall; and the distance the sand falls can be as long as 12 meters. Particles entering the receiver are 'cold', about 600° C., and rise to 900-1000° C. when exiting to bottom.

Early work on the SPR was done primarily by Sandia National Labs (SNL) and focused on identifying an appropriate particle material with respect to optical properties and structural stability, evaluating the heat absorption characteristics of particle flows using a radiant heat source, and creating computational models to simulate receiver operation and aid in design efforts. This initial work at SNL was concluded in 1986, with the recommendation to proceed to on-sun testing on a central receiver platform. More recent SPR work included on-sun testing and optical characterization of a 2 $MW_t$ SPR prototype capable of achieving >300° C. at SNL.

In the absence of external winds, the particle curtain is stable when it falls from the top of the receiver cavity to a collection hopper at the bottom of the receiver cavity and is not expelled out the open aperture to the environment. However, calculations and experimental results indicate the curtain will become unstable when high-intensity external winds blow through the open cavity aperture, especially if the wind enters at oblique angles. Given these conditions, the particles would be blown out the open aperture. This would necessitate shutdown of the receiver. Since windy conditions are expected during many and perhaps most operating days, the receiver must be designed to operate in high winds. Not only can the wind cause a significant amount of net particle loss, but it can also move the curtain away from the receiver back wall and cause wall damage due to overheating.

Interestingly, we discovered that external wind blowing at normal incidence to the receiver (i.e., face-on) does not cause a problem with expelling particles; only when the wind is blowing obliquely.

An air curtain flowing directly across the aperture itself was tried, but didn't work to prevent particle loss.

Against this background, the present invention was developed.

SUMMARY OF THE INVENTION

The present invention relates to suction-recirculation device for stabilizing the flow of a curtain of blackened heat absorption particles falling inside of a solar receiver with an open aperture. The curtain of particles absorbs the concentrated heat from a solar mirror array reflected up to the receiver on a solar power tower. External winds entering the receiver at an oblique angle can destabilize the particle curtain and eject particles. A fan and ductwork is located behind the back wall of the receiver and sucks air out through an array of small holes in the back wall. Any entrained particles are separated out by a conventional cyclone device. Then, the air is recirculated back to the top of the receiver by injecting the recycled air through an array of small holes in the receiver's ceiling and upper aperture front wall. Since internal air is recirculated, heat losses are minimized, and high receiver efficiency is maintained. Suction-recirculation velocities in the range of 1-5 m/s are sufficient to stabilize the particle curtain against external wind speeds in excess of 10 m/s.

BRIEF DESCRIPTION OF THE DRAWINGS

The accompanying drawings, which are incorporated in and form part of the specification, illustrate various examples of the present invention and, together with the detailed description, serve to explain the principles of the invention.

DETAILED DESCRIPTION OF THE INVENTION

The words “cavity”, “receiver”, “receiver cavity” and “box” are used interchangeably.

The method and apparatus of the present invention is a suction-recirculation device that sucks air out of, and recirculates air back into, a solar-powered solid particle receiver cavity (box). This recirculation loop creates a modified internal airflow pattern (sweeping flow) within the receiver that stabilizes the particle curtain against disruption from oblique external wind flows. A fan (or fans) is installed within ductwork located behind the back wall of the cavity. The fan creates a negative pressure, and sucks the internal cavity air through many small holes that are evenly spaced along the back wall. This air is then recirculated and reintroduced back into the cavity through many small holes located in the cavity ceiling and the upper aperture front wall (i.e., top front lip of the cavity). Flow areas are matched so the mass flow rate of air flowing through the back wall is the same as the mass flow rate of air reentering through the ceiling and upper aperture front wall.

When this is done, 3-D computational fluid dynamics (CFD) calculations using the MFIX computer code indicate that particles should not be expelled from the aperture given oblique external winds in excess of 10 m/s. Recirculation flows as low as 2 to 5 m/s have been shown to be sufficient to stabilize the particle curtain. Since the internal air is recirculated, heat losses are minimized and high receiver efficiencies are maintained. Also, since recirculation flow rates are relatively low, the parasitic fan electricity is minimal. Particles sucked through the back wall can be separated from the recirculation airflow via a conventional cyclone separator.

Figure 1:
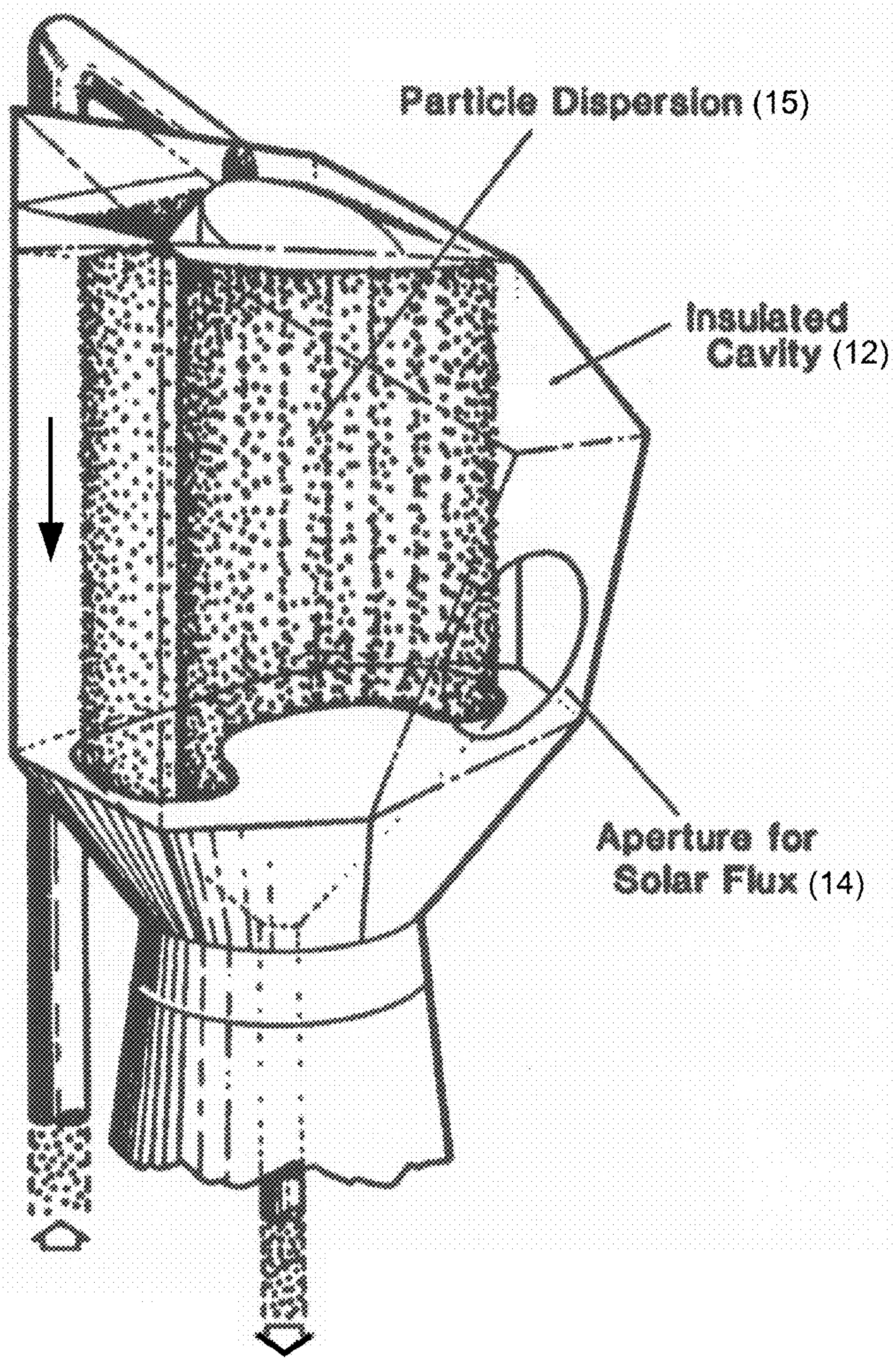
FIG. 1 shows a schematic isometric view of a (prior art) solid particle receiver design for a solar power tower.
Figure 2:
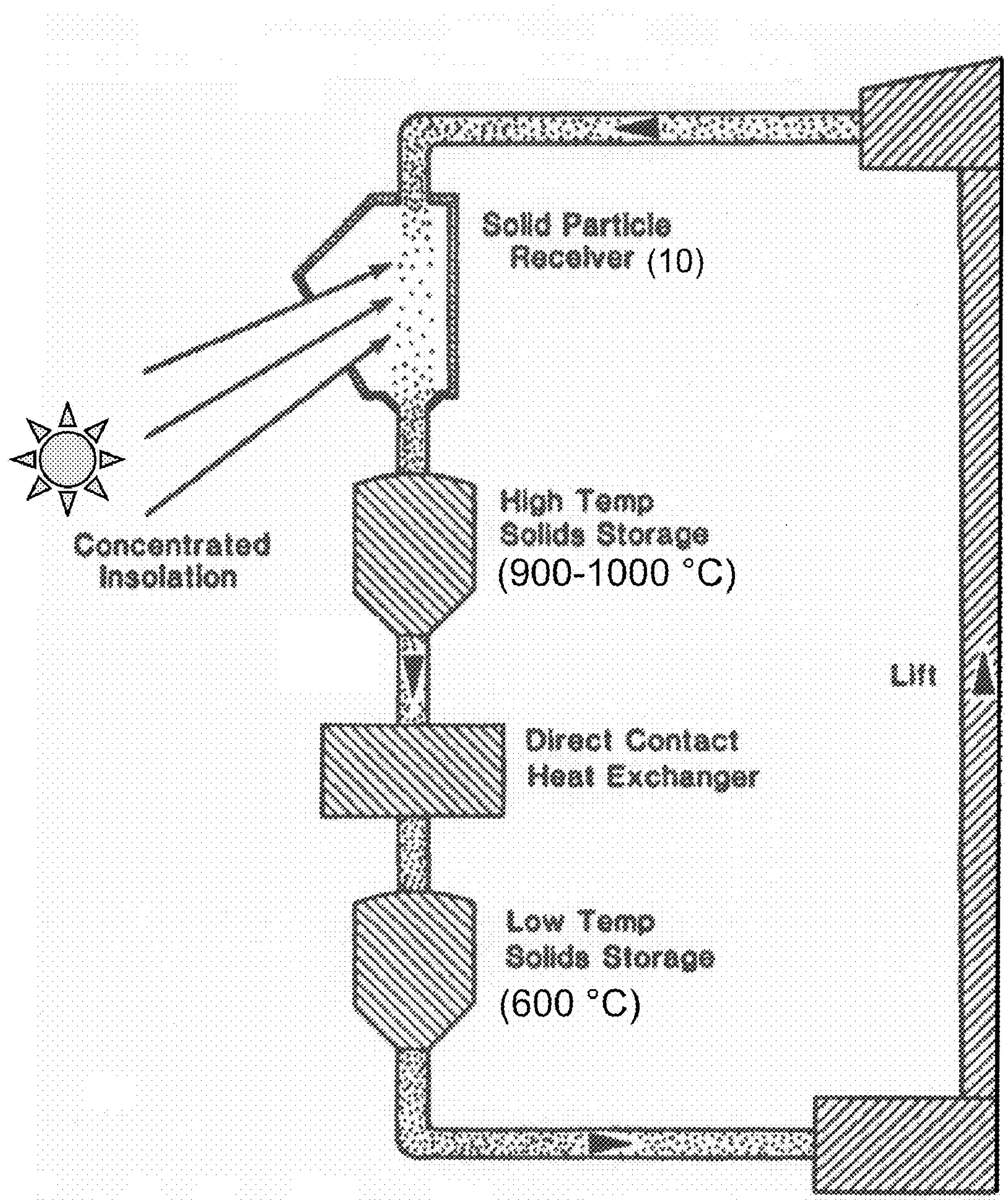
FIG. 2 shows a schematic illustration of a (prior art) solid particle receiver process flow loop for a solar power tower.
Figure 3:
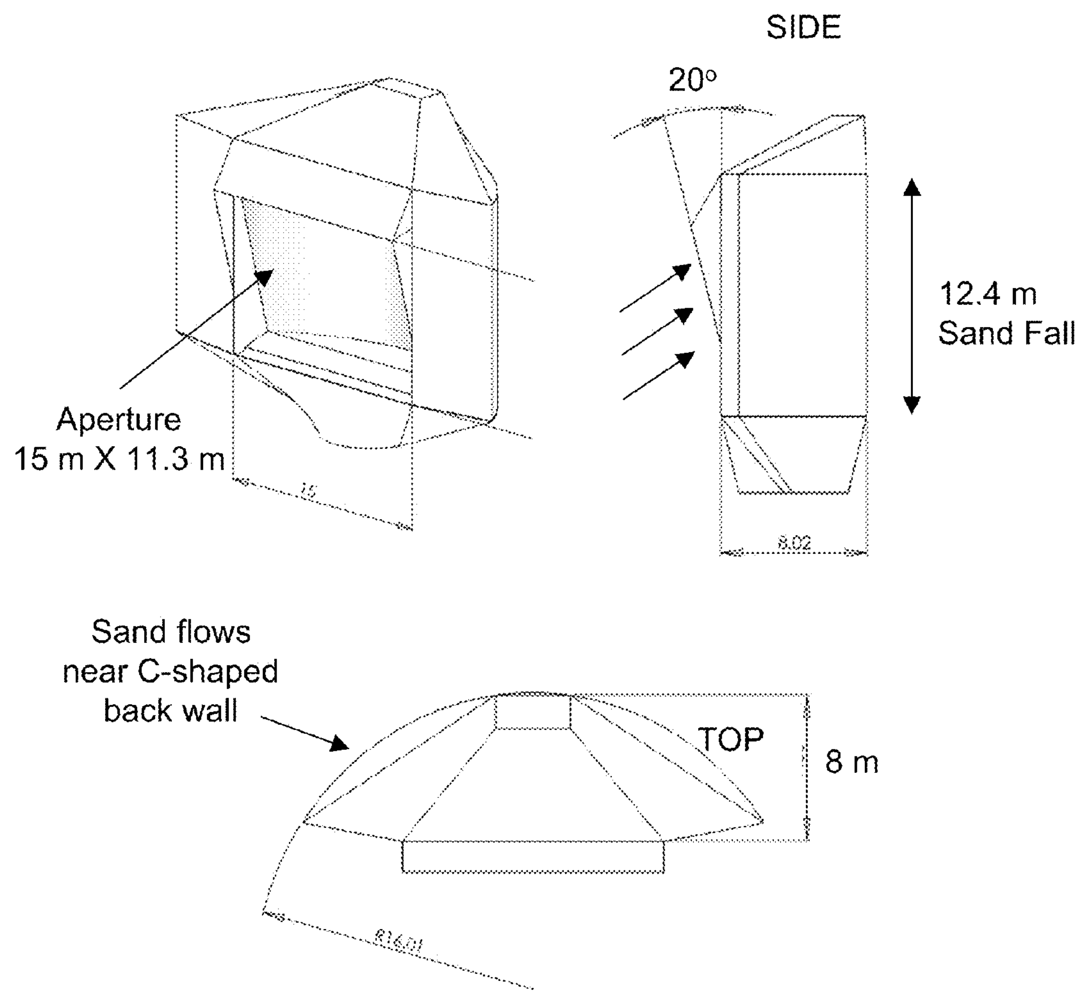
FIG. 3 shows schematic views of a large (prior art) solid particle receiver design for a solar power tower.
Figure 4:
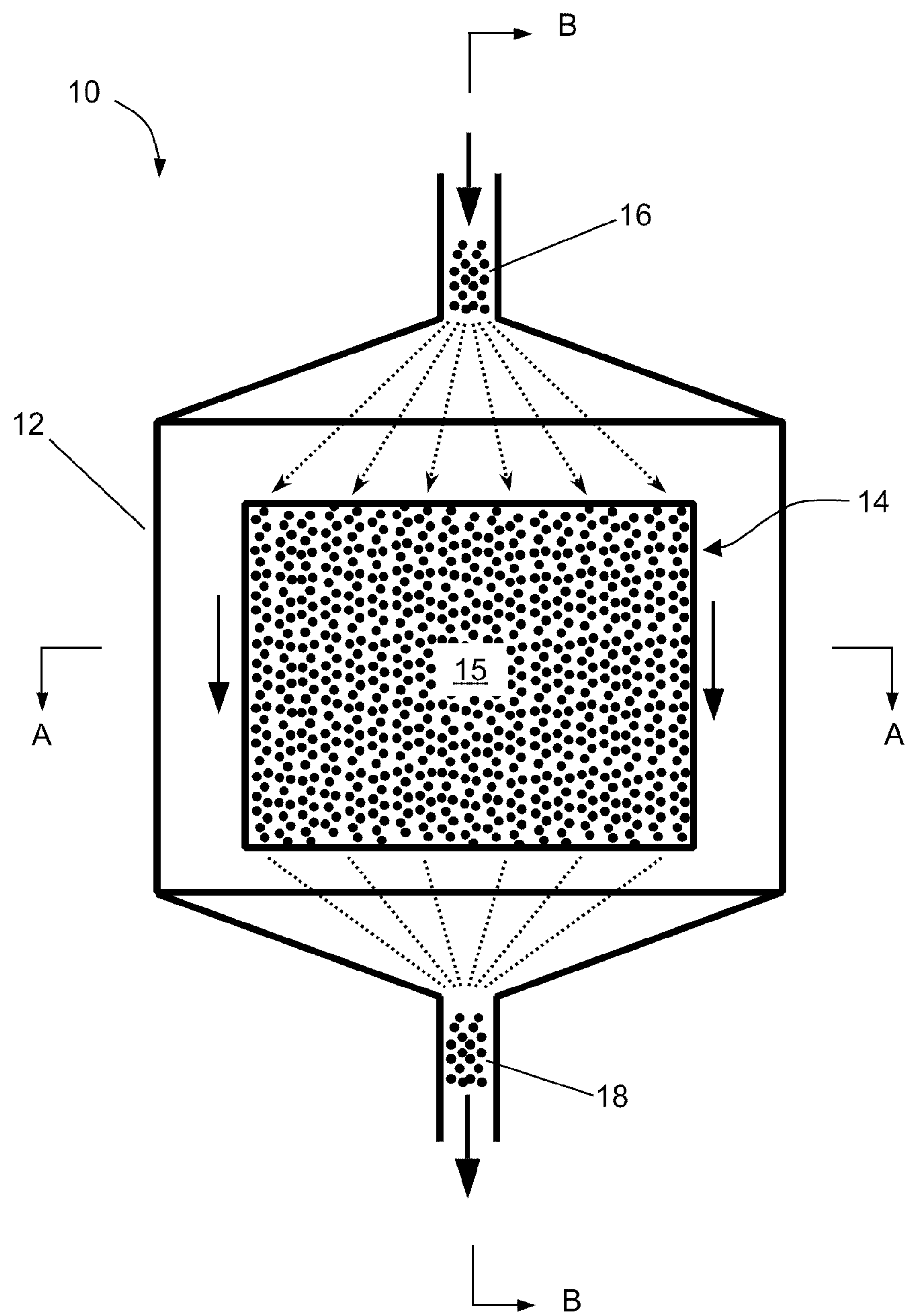
FIG. 4 shows a front elevation view of a solid particle receiver design for a solar power tower.

FIG. 4 shows a front elevation view of a solid particle receiver (SPR) design for a solar power tower. SPR 10 comprises an insulated, hollow box 12 with an open aperture 14 on the box’s front face. The box has a back wall, ceiling, bottom, and two sidewalls. Box 12 can be rectangular in overall shape, or curved with sloped sides (as shown in FIGS. 1 and 3, for example). The aperture can be rectangular, square, circular, oval, or other shapes, as needed, to admit the concentrated solar beams. The darkened particles, 16, fall by gravity from the top as a thin, wide curtain (sheet) 15 of particles, and intercept the solar beam shining through the aperture. Heated particles 18 leave through a slot in the bottom. The box is thermally insulated.

Figure 5:
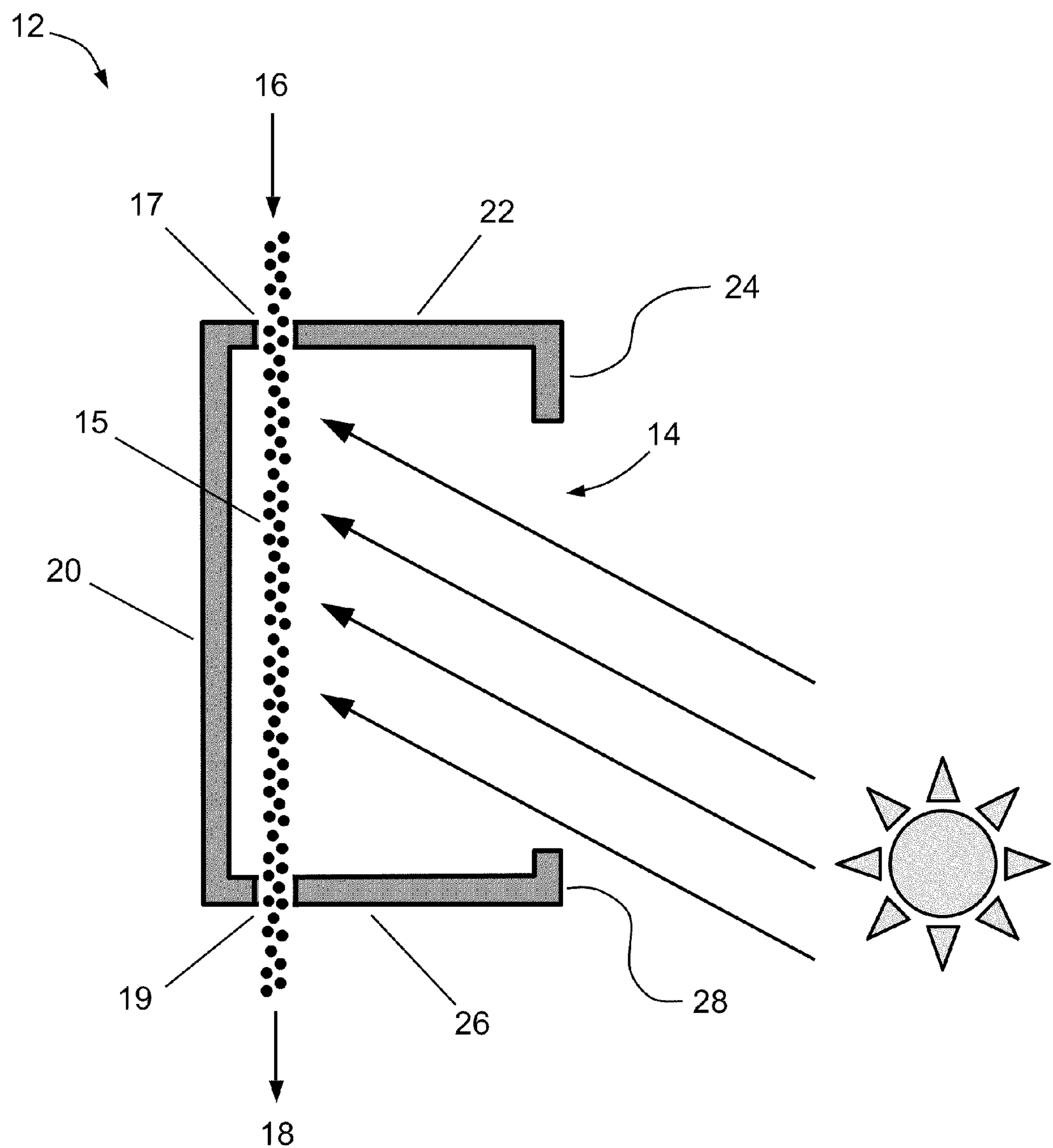
FIG. 5 shows a side elevation cross-section view (Section B-B) of a solid particle receiver design for a solar power tower.

FIG. 5 shows a side elevation cross-section view (Section B-B) of a solid particle receiver design for a solar power tower. Receiver cavity 12 has a back wall 20, bottom surface 26, top surface (ceiling) 22, upper front aperture wall section 24, lower front aperture wall section 28, and aperture opening 14. Cold particles 16 fall down through top slot 17, and form curtain 15. Heated particles 18 exit the bottom through bottom slot 19. The particle curtain 15 is placed close to the back wall.

Figure 6:
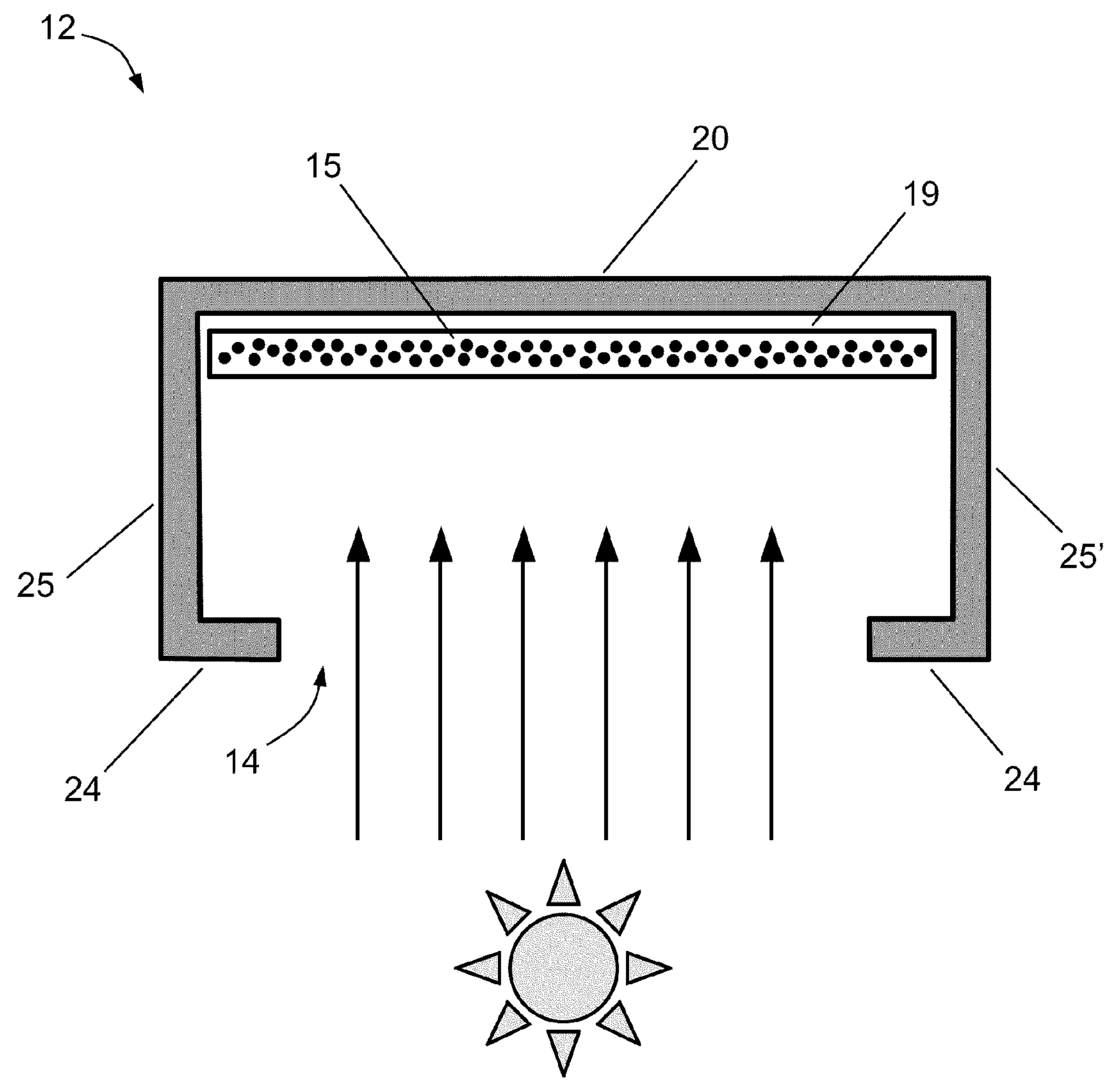
FIG. 6 shows a top cross-section view (Section A-A) of a solid particle receiver design for a solar power tower.

FIG. 6 shows a top cross-section view (Section A-A) of a solid particle receiver design for a solar power tower. Receiver box 12 has a back wall 20, two sidewalls 25, 25' and front face 24 containing aperture 14. The particle curtain 15 generally covers the entire width of the rear wall 20.

Figure 7:
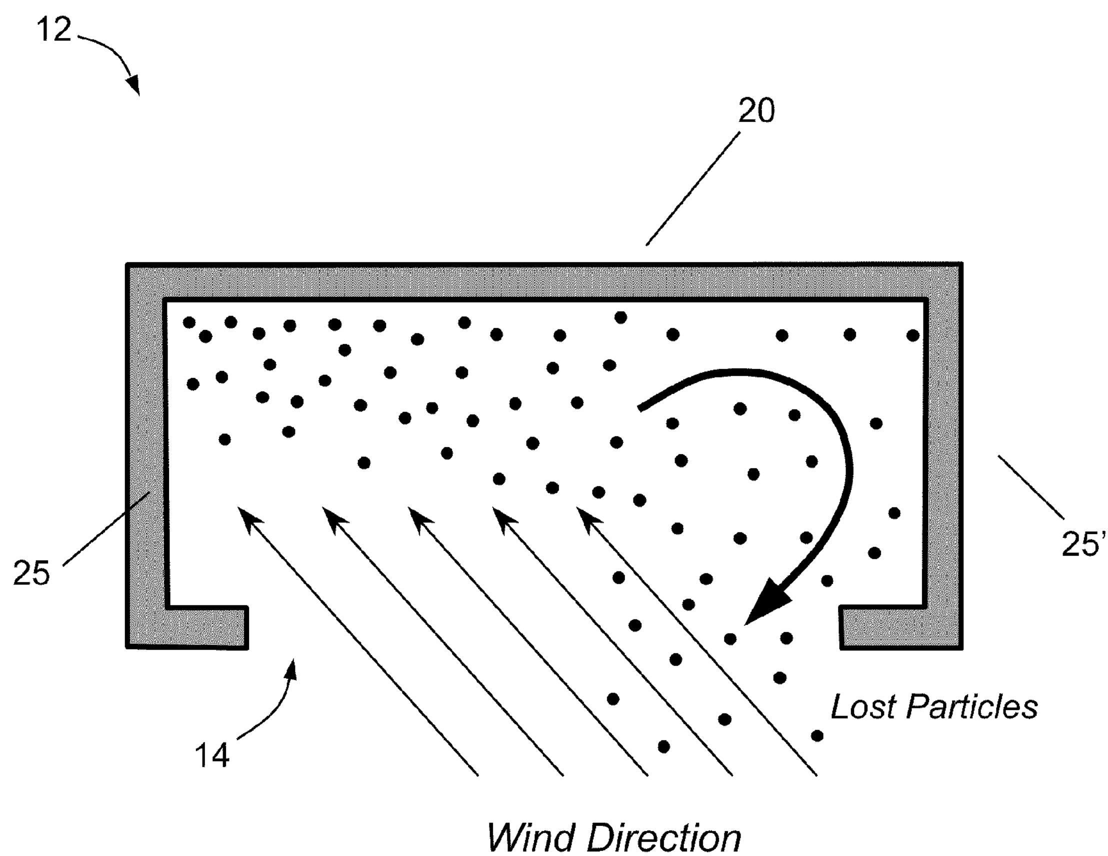
FIG. 7 shows a top cross-section view (Section A-A) of a solid particle receiver design for a solar power tower.

FIG. 7 shows a top cross-section view (Section A-A) of a solid particle receiver design for a solar power tower. Here, external wind is blowing at an oblique angle into the aperture, disrupting the particle curtain and causing some particles to be expelled from the cavity.

Figure 8:
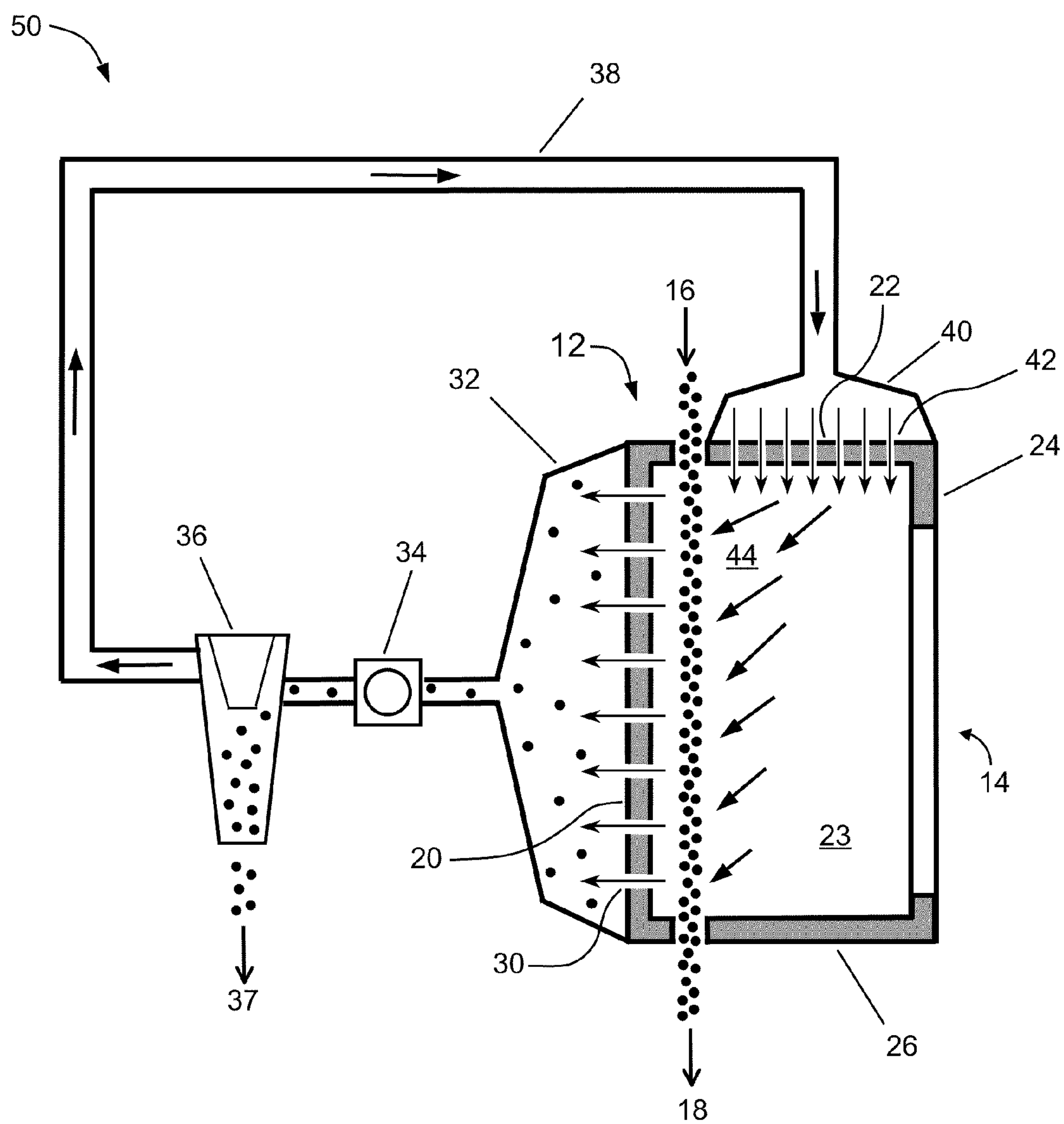
FIG. 8 shows a side elevation cross-section view (Section B-B) of a solid particle receiver design for a solar power tower, illustrating a first example of a suction-recirculation device according to the present invention.

FIG. 8 shows a side elevation cross-section view (Section B-B) of a solid particle receiver design for a solar power tower, illustrating a first example of a suction-recirculation device 50, according to the present invention. The back wall 20 of receiver 12 is perforated with an array of small holes 30. The top surface (ceiling) 22 is also perforated with an array of small holes 42. Suction fan 34 is connected to the back wall holes 30 via ducting 32, and sucks air out of the receiver cavity’s inner volume 23. Cyclone separator 36, placed in line either behind or in front of fan 34, can be used to separate out any entrained particles 37 entrained in the flow through the back wall 20. Any entrained particles 37 are added back to the flow of heated exit particles 18. Fan 34 pushes this air through ducting 38, where it is returned back to the interior of cavity 12 via the upper array of small holes 42 in ceiling 22. The recirculation loop 38, powered by fan 34, creates a sweeping flow 44 of recirculated air that provides a net force (or momentum) that effectively stabilizes the shape and flow of particle curtain 15 against disruptions from external winds blowing into the cavity. Although FIG. 8 illustrates only a single fan and single cyclone separator, it will be appreciated that a large SPR receiver (e.g., 15 meters wide) may require multiple fans and separator units, manifolded with multiple sets of ductwork, to cover the large area of the back wall and ceiling. Not shown are additional flow rate control valves/dampers, flow rate meters, pressure sensors, temperature sensors, ductwork insulation, etc., as would be expected in such a hot gas flow system.

The velocity of airflow being sucked through the perforations of back wall 20 can range from 1 to 5 m/s; and may be about 2 m/s. Flow areas of the back wall and ceiling are appropriately matched so the mass flow through the back wall is the same as the mass flow reentering through the ceiling. The recirculation flow rate (e.g., fan speed, or air flow dampers) can be adjusted as necessary, throughout the day, as the wind velocity changes speed and direction.

Figure 9:
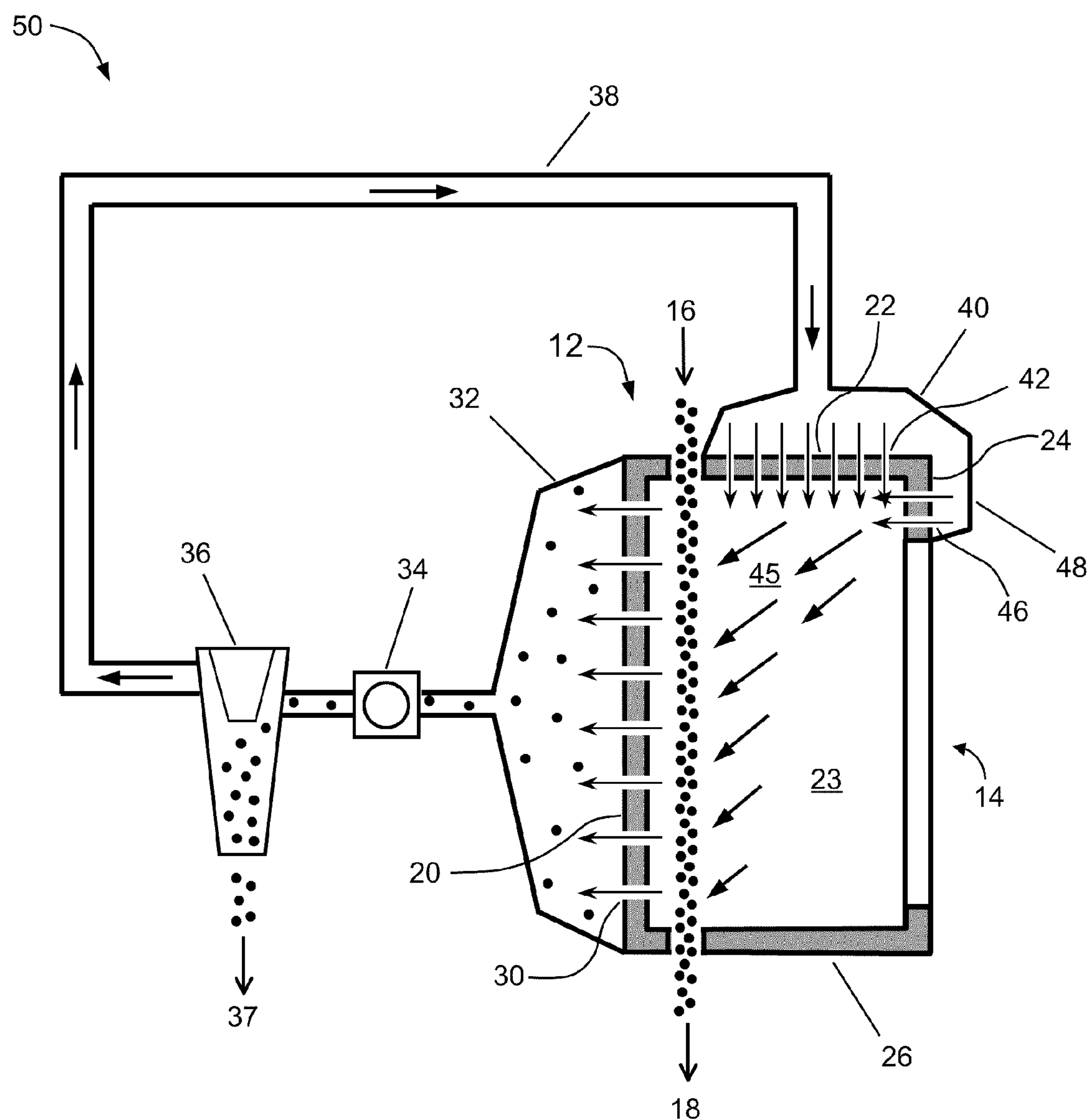
FIG. 9 shows a side elevation cross-section view (Section B-B) of a solid particle receiver design for a solar power tower, illustrating a second example of a suction-recirculation device according to the present invention.

FIG. 9 shows a side elevation cross-section view (Section B-B) of a solid particle receiver design for a solar power tower, illustrating a second example of a suction-recirculation device 50, according to the present invention. This example is the same as described above in FIG. 8, except that the return ducting/manifold 40 has now been extended with additional ducting comprising a larger manifold 48 that wraps-around and covers the upper front aperture wall section 24, which has it's own array of small holes 46 perforating the wall. This provides for additional recirculation airflow flowing through the upper front aperture wall section 24. This arrangement has been shown to provide a more effective sweeping flow 45 (than in FIG. 8), to stabilize the particle curtain.

Figure 10A:
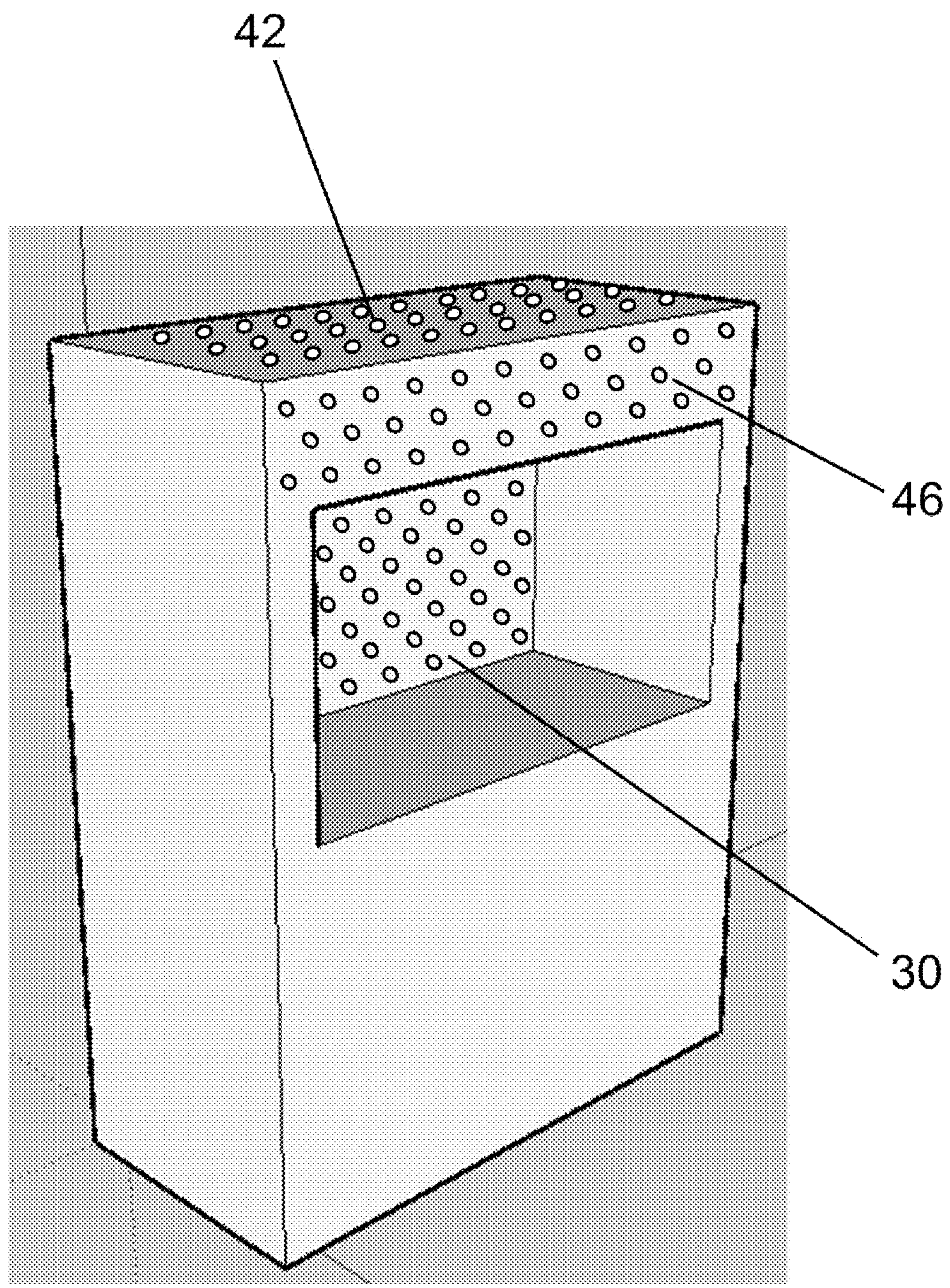
FIG. 10A shows an isometric view of a simplified box model of a receiver cavity used in 3-D CFD flow modeling.
Figure 10B:
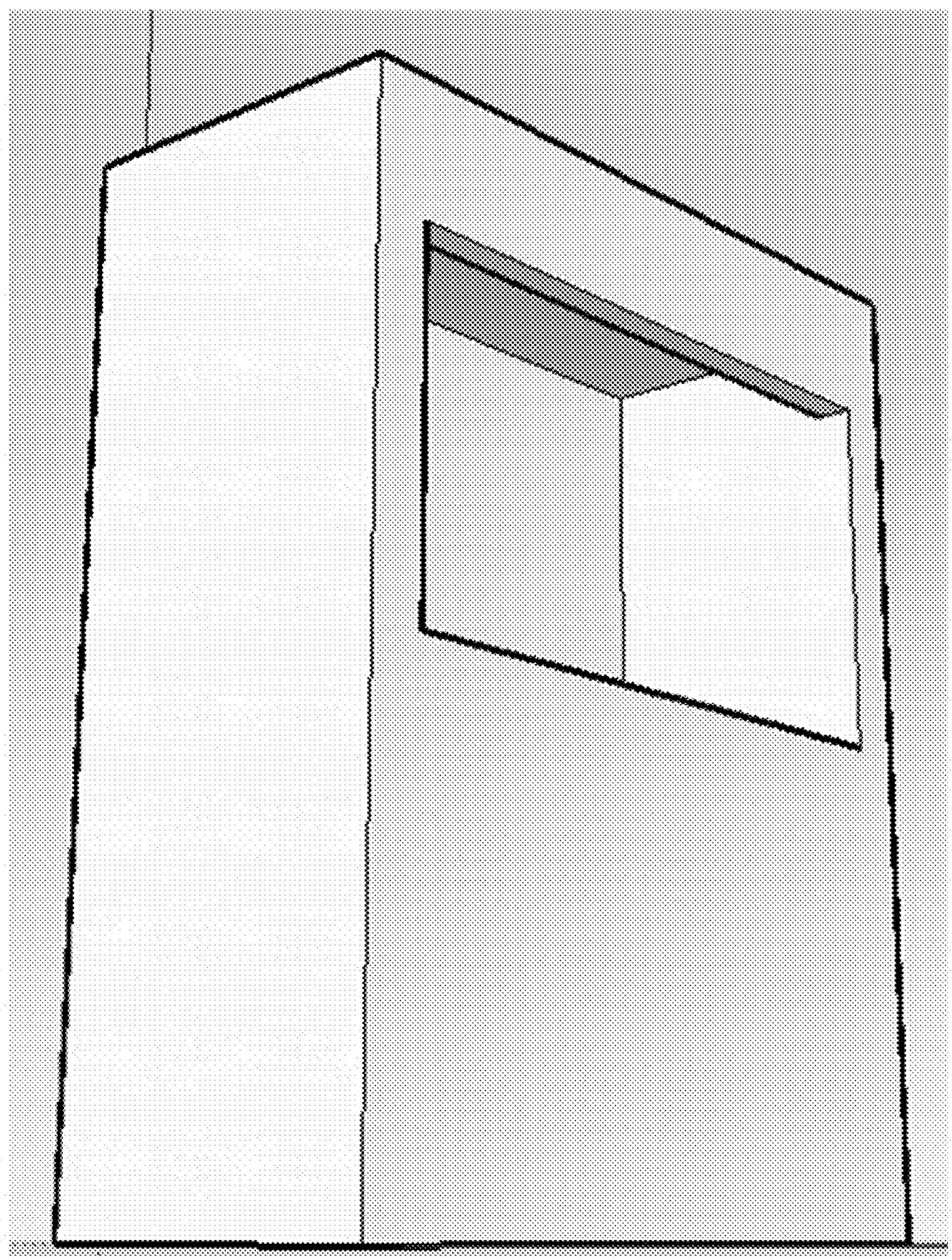
FIG. 10B shows an isometric view of a simplified box model of a receiver cavity used in 3-D CFD flow modeling.

FIGS. 10A and 10B show isometric views of a simplified box model of a receiver cavity that was used in 3-D CFD flow modeling. Perforations (array of holes) 30, 42 and 46 are illustrated in the back wall 20, ceiling 22, and upper aperture front wall section 24, respectively.

Figure 11:
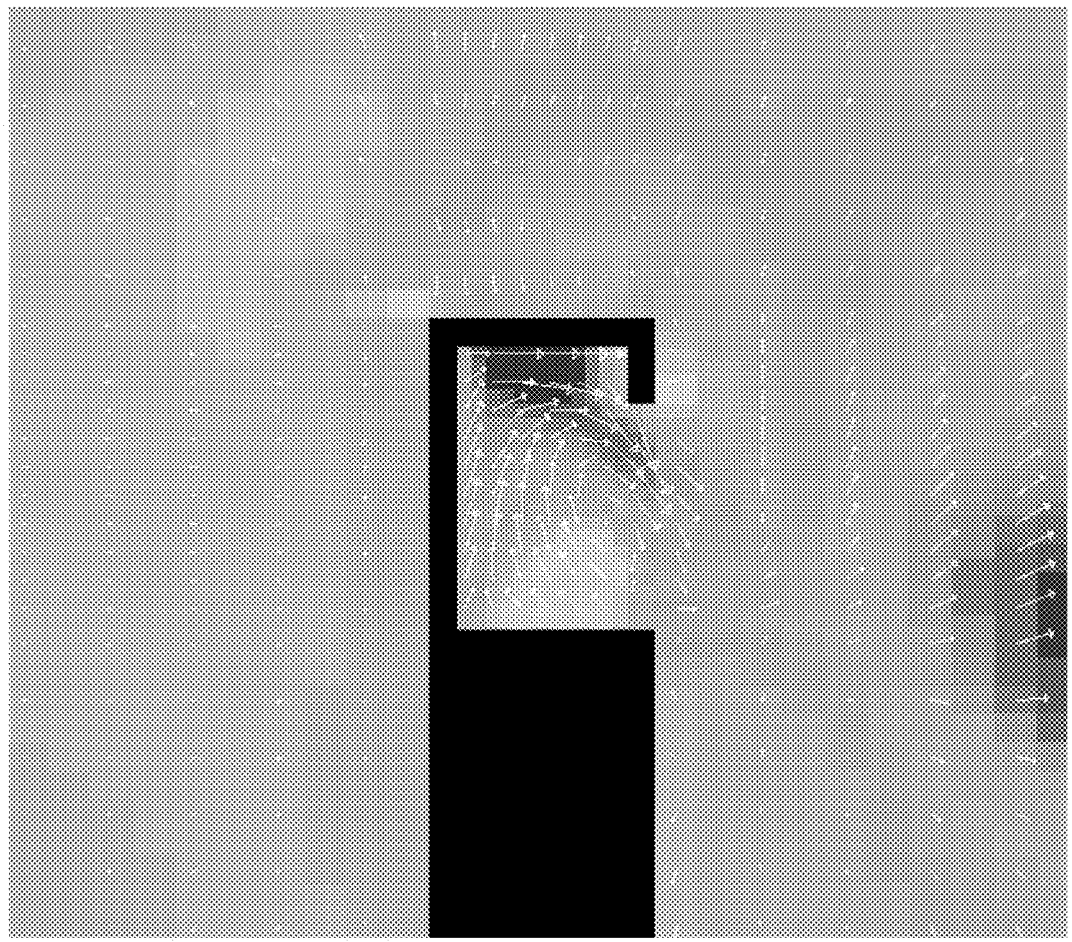
FIG. 11 shows numerical results of the 3-D CFD flow simulations, with the arrows indicating the direction and magnitude of airflow; the view is an elevation cross-section view (Section B-B).

FIG. 11 shows numerical results of the 3-D CFD flow simulations, with the arrows indicating the direction and magnitude of airflow; the view is an elevation cross-section view (Section B-B). Here, external wind at 10 m/s blows at an oblique angle into the aperture, causing particles near the back wall to be expelled from the open aperture. The suction-recirculation device is off in this picture.

Figure 12:
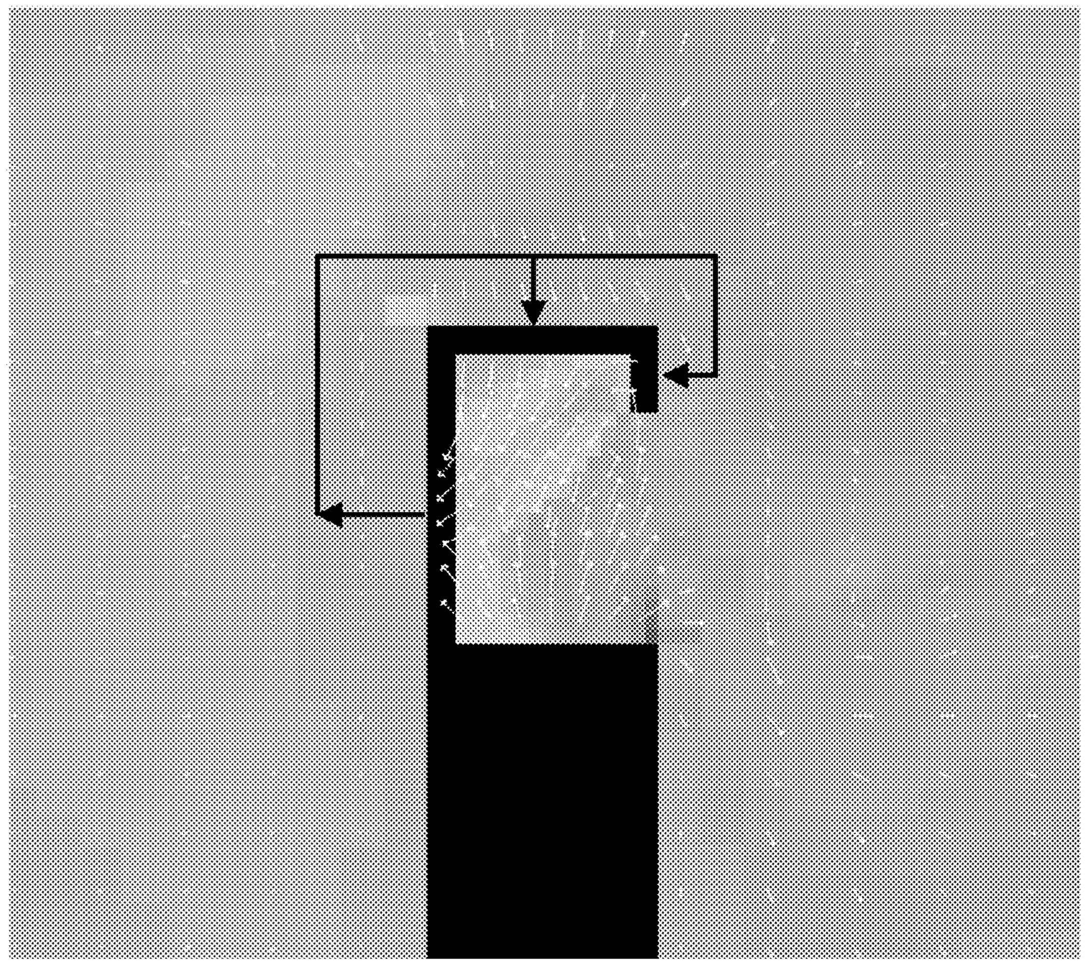
FIG. 12 shows numerical results of the 3-D CFD flow simulations, with the arrows indicating the direction and magnitude of airflow; the view is an elevation cross-section view (Section B-B).

FIG. 12 shows numerical results of the 3-D CFD flow simulations, with the arrows indicating the direction and magnitude of airflow; the view is an elevation cross-section view (Section B-B). External wind at 10 m/s blows at an oblique angle into the aperture. Here, the suction-recirculation device has been activated, which prevents particles near the back wall to not be expelled from the aperture.

Figure 13:
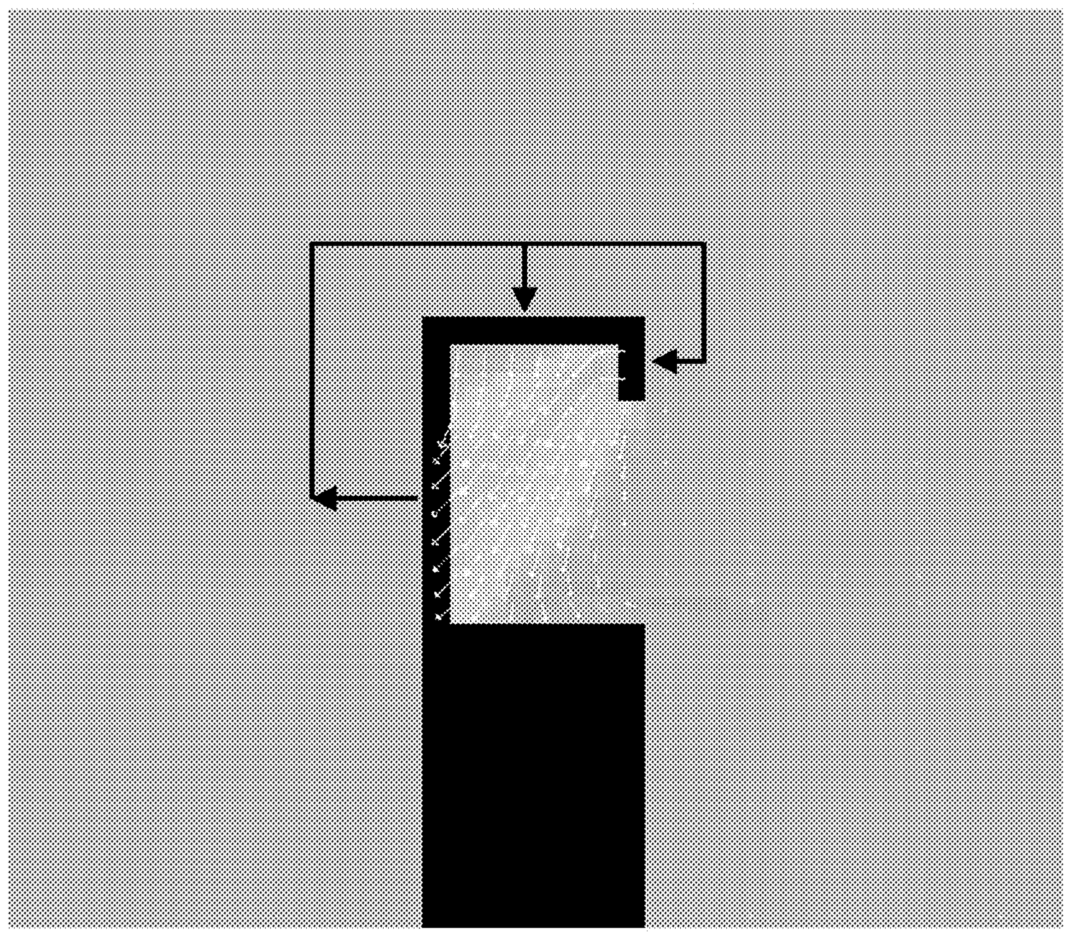
FIG. 13 shows numerical results of the 3-D CFD flow simulations, with the arrows indicating the direction and magnitude of airflow; the view is an elevation cross-section view (Section B-B).
Figure 14:
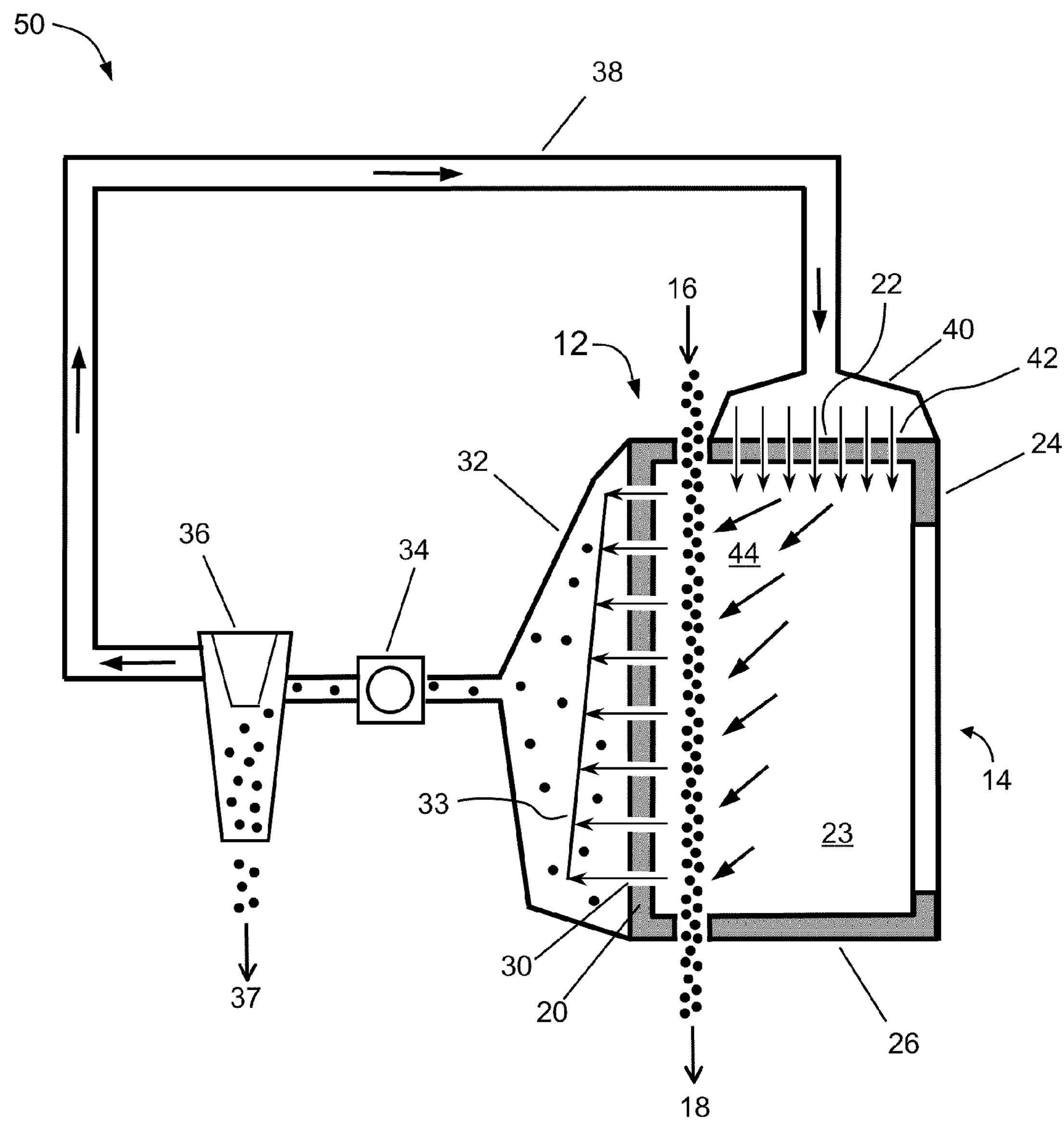
FIG. 14 shows a side elevation cross-section view (Section B-B) of a solid particle receiver design for a solar power tower, illustrating a third of a suction-recirculation device according to the present invention.

FIG. 13 shows numerical results of the 3-D CFD flow simulations, with the arrows indicating the direction and magnitude of airflow; the view is an elevation cross-section view (Section B-B). Here, only the suction-recirculation device has been activated (at 5 m/s), and no external wind is blowing. The sweeping recirculation flow can be seen, which prevents particles near the back wall from being expelled from the aperture.

To gain insight into the wind effect on the curtain, a case study was performed with a reduced-scale box receiver and fans. Cold-flow experiments were performed (i.e. no solar heating) and the results were qualitatively validated using a simulation model created with a 3-D Multiphase Flow with Interphase eXchanges (MFIX) computer code. Test results showed that the particle curtain functioned best when placed closer to the back wall.

Additionally, wind spoilers can be added to the outside of the receiver box to disrupt the flow of winds, and help prevent particle loss.

In one embodiment, the array of small holes 30 in back wall 20 comprises a regularly-spaced array of uniformly sized holes.

Figure 15:
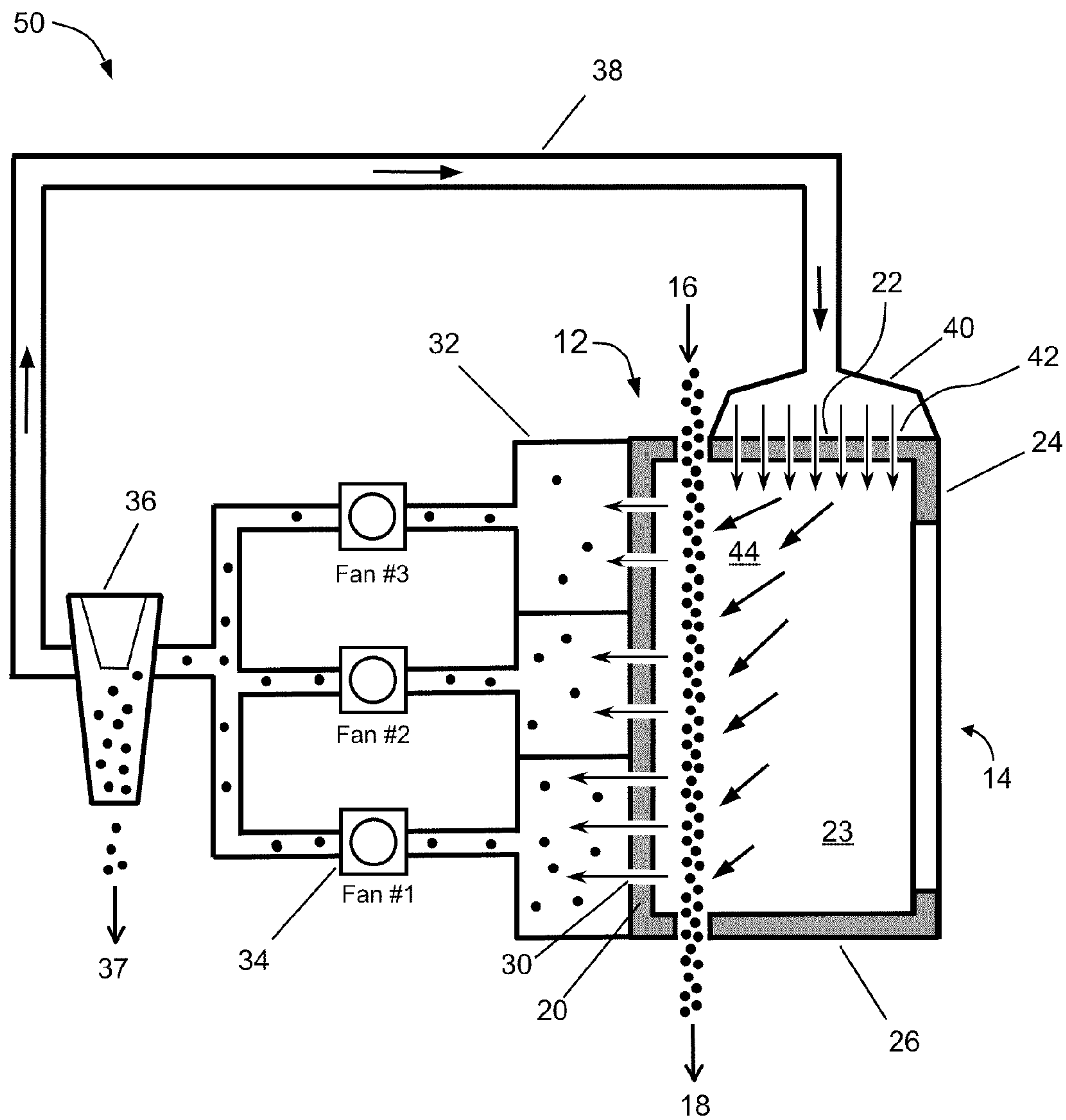
FIG. 15 shows a side elevation cross-section view (Section B-B) of a solid particle receiver design for a solar power tower, illustrating a fourth of a suction-recirculation device according to the present invention.

In a different embodiment, the array of small holes 30 in back wall 20 comprises a regularly-spaced array of differently-sized holes. For example, FIG. 15 shows a linear variation in the spatial distribution 33 of velocity of airflow crossing the back wall boundary 20, with a lower velocity a the top of the back wall, and a higher velocity at the bottom of the back wall. This can be achieved by using larger diameter holes near the bottom of the back wall, graduating to smaller diameter holes near the top of the back wall. Manifold ducting 32 can been modified to account for the variation in airflow velocities from top to bottom.

Alternatively, such a variable distribution in velocities from top to bottom along the back wall 20 can be achieved by varying the spacing between holes (i.e., area number density), where the hole diameter is the same for all the holes. For example, to achieve the linear velocity gradient shown in FIG. 15, the number of holes/ft$^2$ would be lower at the top of back wall 20, graduating to a higher number of holes/ft$^2$ at the bottom of back wall 20.

Alternatively, as shown in FIG. 15, multiple fans 34 (e.g., 3 different fans running at different speeds), coupled to compartmentalized manifolds 32, can be used to provide a variation in mass flow rate of air from top to bottom. Optionally, airflow valves/dampers (not shown) can be used to control the flow rate through the three parallel ductworks, while running the 3 fans at the same speed.

The particular examples discussed above are cited to illustrate particular embodiments of the invention. Other applications and embodiments of the apparatus and method of the present invention will become evident to those skilled in the art. It is to be understood that the invention is not limited in its application to the details of construction, materials used, and the arrangements of components set forth in the following description or illustrated in the drawings.

The scope of the invention is defined by the claims appended hereto.

What is claimed is:

1. A suction-recirculation device for stabilizing particle flows within a solar powered solid particle receiver against external winds blowing at an oblique angle, comprising:

an insulated receiver box comprising a front face with a open aperture, a back wall, a ceiling, a bottom, and two side walls;

a top slot and a bottom slot, located near the back wall, that direct a flow of solid particles to form into a particle curtain that intercepts rays of concentrated solar radiation shining through the aperture;

a first array of holes perforating the back wall;

a second array of holes perforating the ceiling; and a suction-recirculation loop comprising a suction fan and ducting configured for sucking air out of the box through the first array of holes in the back wall, and for recirculating and reintroducing said air back into the box through the second array of holes in the ceiling;

whereby the recirculating air flow creates a sweeping airflow inside the box that stabilizes the particle curtain from disruption by external winds blowing into the box at an oblique angle.

2. The device of claim 1, further comprising a cyclone separator disposed for separating out any particles entrained into the suction-recirculation loop by the suction fan.

3. The device of claim 2, wherein the cyclone separator is disposed downstream of the suction fan.

4. The device of claim 2, wherein the cyclone separator is disposed upstream of the suction fan.

5. The device of claim 2, further comprising:

a third array of holes perforating the upper aperture front wall section; and additional ducting for recirculating and reintroducing said air back into the box through both the second array of holes in the ceiling and the third array of holes in the upper aperture front wall section.

6. The device of claim 5, wherein the flow areas of the first array of holes in the back wall are appropriately matched to the sum of the flow areas of the second array of holes in ceiling and the third array of holes in the upper aperture front wall section, so that the mass flow rate of air flowing through the back wall is the same as the mass flow rate of air reentering through the ceiling and the upper aperture front wall section.

7. The device of claim 1, wherein velocity of recirculated air flowing through the holes ranges from 1 to 5 m/s.

8. The device of claim 1, wherein the flow areas of the first array of holes in the back wall and the flow areas of the second array of holes in ceiling are appropriately matched so the mass flow rate of air flowing through the back wall is the same as the mass flow rate of air reentering through the ceiling.

9. The device of claim 1, wherein the first array of holes perforating the back wall are configured to produce a spatial variation in airflow velocity from top to bottom along the back wall.

10. The device of claim 9, wherein the spatial variation in airflow velocity from top to bottom along the back wall is such that the velocity is higher at the bottom of the back wall, and lower at the top.

11. The device of claim 9, wherein the spatial variation in airflow velocity from top to bottom along the back wall is created by varying the diameter of the holes in the first array, from top to bottom.

12. The device of claim 9, wherein the spatial variation in airflow velocity from top to bottom along the back wall is created by varying the spacing between the holes in the first array, from top to bottom.

13. The device of claim 9, wherein the spatial variation in airflow velocity from top to bottom along the back wall is created by using multiple suction fans, coupled to compartmentalized manifolding connected to different areas of the back wall, running a different fan speeds.

14. The device of claim 9, wherein the spatial variation in airflow velocity from top to bottom along the back wall is created by using airflow control valves coupled to multiple suction fans, coupled to compartmentalized manifolding connected to different areas of the back wall.

15. A suction-recirculation device for stabilizing particle flows within a solar powered solid particle receiver against external winds blowing at an oblique angle, comprising:

an insulated receiver box comprising a front face with a open aperture, a back wall, a ceiling, a bottom, and two side walls;

a top slot and a bottom slot, located near the back wall, that direct a flow of solid particles to form into a particle curtain that intercepts rays of concentrated solar radiation shining through the aperture;

a first array of holes perforating the back wall;

a second array of holes perforating the ceiling; and a suction-recirculation loop comprising a suction fan and ducting configured for sucking air out of the box through the first array of holes in the back wall, and for recirculating and reintroducing said air back into the box through the second array of holes in the ceiling;

whereby the recirculating air flow creates a sweeping airflow inside the box that stabilizes the particle curtain from disruption by external winds blowing into the box at an oblique angle;

further comprising a cyclone separator disposed for separating out any particles entrained into the suction-recirculation loop by the suction fan;

and the device further comprising:

a third array of holes perforating the upper aperture front wall section; and additional ducting for recirculating and reintroducing said air back into the box through both the second array of holes in the ceiling and the third array of holes in the upper aperture front wall section.

16. The device of claim 15, wherein the flow areas of the first array of holes in the back wall are appropriately matched to the sum of the flow areas of the second array of holes in ceiling and the third array of holes in the upper aperture front wall section, so that the mass flow rate of air flowing through the back wall is the same as the mass flow rate of air reentering through the ceiling and the upper aperture front wall section.

17. The device of claim 15, wherein the velocity of recirculated air flowing through the holes ranges from 1 to 5 m/s.

18. A method of stabilizing particle flows within a solar powered solid particle receiver against external winds blowing at an oblique angle, comprising:

providing an insulated receiver box comprising a front face with a open aperture, a back wall, a ceiling, a bottom, and two side walls; a top slot and a bottom slot, located near the back wall, that direct a flow of solid particles to form into a particle curtain that intercepts rays of concentrated solar radiation shining through the aperture; a first array of holes perforating the back wall; a second array of holes perforating the ceiling; and a suction-recirculation loop comprising a suction fan and ducting configured for sucking air out of the box through the first array of holes in the back wall, and for recirculating and reintroducing said air back into the box through the second array of holes in the ceiling; and creating a sweeping airflow inside the box that stabilizes the particle curtain from disruption by external winds blowing into the box at an oblique angle by sucking air out of the box through the first array of holes, and then recirculating and reintroducing said air back into the box through the second array of holes in the ceiling.

19. The method of claim 18, further comprising separating out any particles entrained into the recirculation loop flow, from said recirculation flow, by using a cyclone separator.

20. The method of claim 18, wherein the box further comprises:

a third array of holes perforating the upper aperture front wall section; and additional ducting for recirculating and reintroducing said air back into the box through both the second array of holes in the ceiling and the third array of holes in the upper aperture front wall section; and wherein the method further comprises recirculating and reintroducing said air back into the box through both the second array of holes in the ceiling and the third array of holes in the upper aperture front wall section.

21. The method of claim 18, further comprising flowing the recirculated air through the holes ranges at a velocity of from 1 to 5 m/s.

* * * * *